Figure 1:
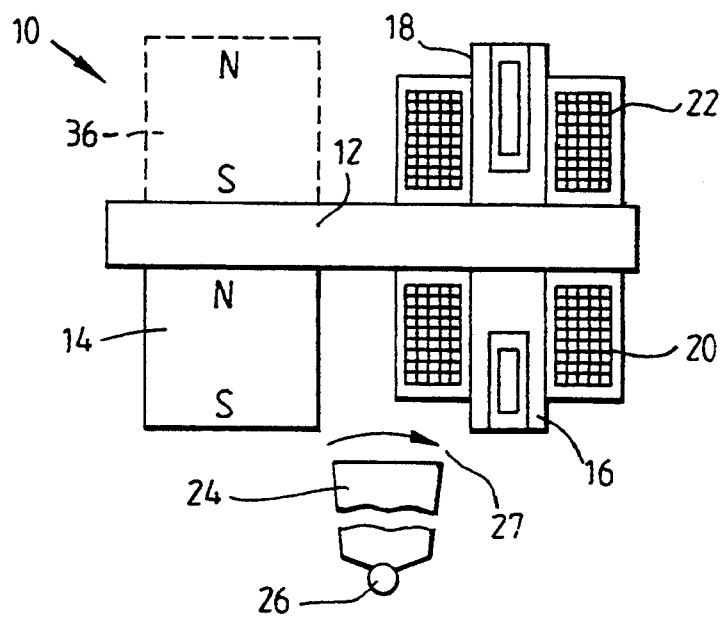

United States Patent
Kulczyk

[11] Patent Number: 5,373,234
[45] Date of Patent: Dec. 13, 1994

[54] INDUCTIVE SPEED OR TORQUE SENSOR WITH COMPENSATION FOR EXTERNAL MAGNETIC FIELDS

[75] Inventor: Konrad Kulczyk, Frimley, England

[73] Assignee: Solartron Group Limited, England

[21] Appl. No.: 32,596

[22] Filed: Mar. 17, 1993

[30] Foreign Application Priority Data

Mar. 21, 1992 [GB] United Kingdom ............. 9206203

[51] Int. Cl.$^5$ .................... G01P 3/49; G01P 3/488
[52] U.S. Cl. ........................ 324/174; 73/519;
324/207.12; 324/225; 324/164
[58] Field of Search ........... 324/164, 173, 174, 207.12, 324/207.15, 207.18, 207.19, 207.25, 225, 241; 73/518, 519, 862.331, 862.332; 310/155, 168

[56] References Cited

U.S. PATENT DOCUMENTS

| | | | |
|---|---|---|---|
| 3,617,874 | 11/1971 | Forster | 324/241 |
| 3,932,813 | 1/1976 | Gallant . | |
| 3,984,713 | 10/1976 | Presley . | |
| 4,841,243 | 6/1989 | Bishop et al. . | |
| 4,901,015 | 2/1990 | Pospischil et al. | 324/174 X |
| 5,117,181 | 5/1992 | Clergeot et al. | 324/173 X |

FOREIGN PATENT DOCUMENTS

| | | |
|---|---|---|
| 2288313 | 5/1976 | France . |
| 1070421 | 12/1959 | Germany ........... 324/174 |
| 1192428 | 6/1961 | Germany . |

OTHER PUBLICATIONS

Ramirez, C. N.; Reluctance Sensor, IBM Technical Disclosure Bulletin, vol. 22 No. 9 Feb. 1980, pp. 3907, 3908.

Primary Examiner—Gerard R. Strecker
Attorney, Agent, or Firm—Lerner, David, Littenberg, Krumholz & Mentlik

[57] ABSTRACT

A speed or torque probe comprises a permanent magnet havings its north-south axis extending radially of a bladed rotor, so that the tips of the blades pass in close proximity to one pole of the magnet, and a T-shaped pole piece. A first portion of the pole piece, corresponding to the upright portion of its T-shape, extends tangentially of the rotor, with its free end in contact with the other pole of the magnet, while the other portion of the pole piece, corresponding to the cross-piece of its T-shape, again extends radially of the rotor. As a result, the magnet, the first portion of the pole piece and the half of the other portion nearer to the rotor form a variable magnetic circuit, such that the passing rotor blades induce eddy currents in a first coil wound upon the half of the other portion of the pole piece nearer to the rotor. A second coil is wound on the half of the other portion of the pole piece further from the rotor, and connected in opposition to the first coil, so that voltages induced by stray external magnetic fields in the first coil tend to be cancelled by those induced by these same fields in the second coil.

7 Claims, 1 Drawing Sheet

U.S. Patent  Dec. 13, 1994  5,373,234

INDUCTIVE SPEED OR TORQUE SENSOR WITH COMPENSATION FOR EXTERNAL MAGNETIC FIELDS

This invention relates to inductive sensors for sensing the movement of an electrically conductive or magnetic member, and is more particularly but not exclusively concerned with such sensors for use in gas turbine engines as speed or torque sensing probes.

Inductive sensors for use as speed or torque sensing probes in gas turbine engines typically work on the eddy current or magnetic reluctance principle. In the former case, a permanent magnet magnetically coupled to a pole piece is arranged to define a magnetic flux pattern through which the blades of one of the engine rotors pass. A winding is provided on the pole piece, and eddy currents induced in each blade as it passes through the flux pattern change the flux in the magnetic circuit defined by the magnet and the pole piece and so induce a voltage pulse in the winding.

These sensors suffer from the disadvantage that spurious voltage pulses can be induced in the winding by extraneous magnetic flux changes which have nothing to do with the moving rotor blades, but are caused for example by varying electrical currents in engine accessories such as igniters. These spurious voltage pulses can be larger than the voltage pulses due to the moving rotor blades, and thus introduce large errors.

One way of overcoming this disadvantage is described in United Kingdom Patent Specification No. 1 386 035, which discloses an eddy current sensor having a magnetic circuit comprising an E-shaped magnetic core with three parallel legs. The central leg is a permanent magnet, while the two side legs both serve as pole pieces and have respective windings on them. It is assumed that the aforementioned extraneous magnetic flux changes will affect both windings equally, i.e. will induce equal voltages in each, so that these equal voltages can simply be cancelled out by connecting the two windings in opposition.

However, by virtue of the E-shape of the core, the two windings are not especially close together, while the extraneous magnetic fields in modern engines can have rather high gradients. In practice, therefore, the respective voltages induced in the two windings by these extraneous magnetic fields will not necessarily be equal, and may therefore not cancel at all well. It is an object of the present invention to alleviate this drawback.

According to the present invention, there is provided an inductive sensor for sensing the movement of an electrically conductive or magnetic member, the sensor comprising a magnet and a first pole piece projecting generally parallel to each other from respective ends of a ferromagnetic support member so as to define a magnetic flux pattern through which the object passes, a second pole piece projecting from the same end of the support member as, but generally in the opposite direction to, the first pole piece, and first and second windings wound on the first and second pole pieces respectively, whereby movement of the object through the flux pattern induces a substantially larger voltage in the first winding than in the second, the windings being connected together and arranged such that flux changes in the vicinity of the sensor due to causes other than the movement of the object tend to induce in the windings substantially equal and opposite voltages which substantially cancel each other out.

The magnet is preferably a permanent magnet.

Conveniently, the first and second windings are substantially identical, as are the first and second pole pieces. Also, the first and second pole pieces are preferably substantially coaxial with each other. However, if necessary in a particular application (i.e. because the magnetic flux changes affecting the first and second pole pieces are slightly different), the inductance of the second winding and/or the angle between the axes of the pole pieces can be selected so as to enhance the equality (and therefore the cancellation) of said substantially equal and opposite voltages. Thus the second pole piece can have an axially movable core and/or can be adjustably inclinable by a small amount with respect to the axis of the first pole piece.

Advantageously, the sensor further comprises a second magnet, substantially identical to the first magnet, projecting from the same end of the support member as, but generally in the opposite direction to, the first magnet.

Figure 2:
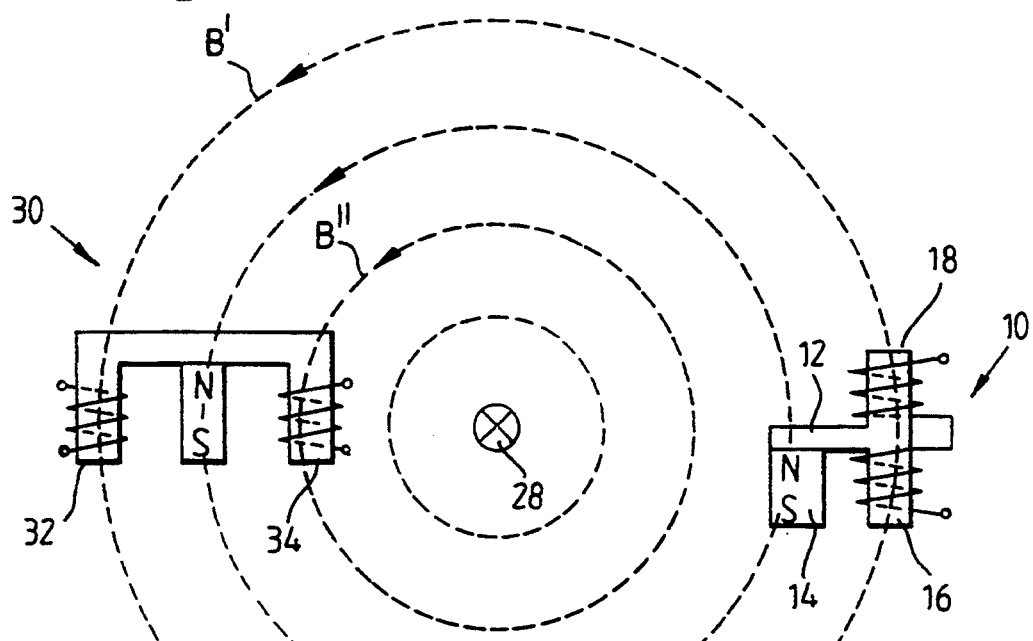

The invention will now be described, by way of example only, with reference to the accompanying drawings, of which:

FIG. 1 is a simplified schematic drawing of an inductive speed sensing probe in accordance with the present invention; and FIG. 2 illustrates the improved operation of the probe of FIG. 1.

The inductive speed sensing probe of FIG. 1 is indicated generally at 10, and comprises a ferromagnetic support member or yoke 12 having a permanent magnet 14 projecting from one end and a first pole piece 16 projecting from the other end, generally parallel to the magnet. A second pole piece 18, similar to and substantially coaxial with the first, projects from the yoke 12 in the opposite direction to the first pole piece. Substantially identical coils or windings 20, 22 are wound on the pole pieces 16, 18 respectively, the coils being connected together in series opposition.

In use, the probe 10 is mounted in the casing (not shown) of a gas turbine engine, such that the yoke 12 extends generally tangentially of the casing while the magnet 14 and first pole piece 16 project generally radially inwardly of the casing towards the path traversed by the tips of the blades of one of the rotors of the engine: such a blade is indicated at 24 in FIG. 1. The blade 24 is attached to a shaft 26 which rotates clockwise as viewed in FIG. 1, thus moving the blade in the direction of the arrow 27.

The magnetic circuit formed by the yoke 12, the magnet 14 and the first pole piece 16 defines a magnetic flux pattern in the region in and around the gap between the respective free ends of the magnet and the pole piece, and the tips of the blades 24 successively pass through this flux pattern as the shaft 26 rotates. As the tip of each blade 24 passes through the flux pattern, eddy currents are induced in the blade, and this in turn varies the flux in the aforementioned magnetic circuit and so induces a voltage pulse in the coil 20. However, a very much smaller voltage pulse is induced in the coil 22, since it and its pole piece 18 are not only further away from the tip of the blade 24, but also outside the aforementioned magnetic circuit. The combined output signal derived from both coils 20,22 is therefore effectively a slightly reduced amplitude version of the voltage pulse induced in the first coil 20.

Extraneous magnetic flux changes, on the other hand, produced for example by varying electrical current flowing in an electrical conductor extending perpendicular to the plane of FIG. 1, tend to affect both of the pole pieces 16, 18 equally, since the pole pieces 16, 18 are so close together and substantially aligned with each other. This is shown somewhat schematically in FIG. 2, where the conductor is indicated at 28. As a result substantially equal but opposite voltages are induced in the coils 16, 18, which voltages substantially cancel each other out.

Also shown in FIG. 2, again somewhat schematically, is a sensor of the kind described in the aforementioned United Kingdom Patent Specification No. 1 386 035. This sensor is indicated at 30, and it can be seen that its two side legs 32, 34 are subjected to significantly different levels of the varying magnetic flux produced by the conductor 28, because of their significantly different distances from this conductor.

Clearly, FIG. 2 is somewhat simplistic, in that the conductor 28 can have positions and orientations other than that shown. However, in a given engine, the positions and orientations of such conductors will be fixed, so that the varying flux changes they produce can be determined. In such circumstances, if these flux changes are of slightly different magnitudes at the respective positions of the pole pieces 16, 18, this can be taken into account either by slightly increasing or decreasing the number of turns in the coil 22, and/or by slightly altering the orientation of the pole piece 18 with respect to the pole piece 16, and/or by providing the pole piece 18 with an axially movable tuning slug or core, so as to enhance the voltage cancelling effect mentioned earlier. Typically, the optimum arrangement would be determined by trial and error using an adjustable version of the sensor 10, and this optimum arrangement would then be implemented in a non-adjustable production version of the sensor.

A number of modifications can be made to the described embodiment of the invention. For example, to render the respective magnetic circuits containing the pole pieces 16 and 18 more closely similar to each other, the sensor 10 can be provided with a second permanent magnet, identical to the magnet 14, and projecting from the yoke 12 at the same end as the magnet 14 but in the opposite direction: this second magnet is shown in dotted lines at 36 in FIG. 1. The increased similarity or symmetry between the respective magnetic circuits based on the pole pieces 16,18 provided by this second magnet 36 renders the matching of the coils 20,22 somewhat easier. In another modification, the yoke 12 and the pole pieces 16, 18 can be made integral with each other from a single piece of ferromagnetic material. And although the invention has been described in relation to a sensor which works on the eddy current principle, it is equally applicable to sensors which work on the variable magnetic reluctance principle (where the sensor co-operates with a toothed wheel or the like made of a magnetic material, instead of with the blades 24).

I claim:

1. An inductive sensor for sensing the movement of an electrically conductive or magnetic member, the sensor comprising a magnet and a first pole piece projecting generally parallel to each other from respective ends of a ferromagnetic support member so as to define a magnetic flux pattern through which the object passes, a second pole piece projecting from the same end of the support member as the first pole piece, in substantially axial alignment with the first pole piece but generally in the opposite direction thereto, and first and second windings wound on the first and second pole pieces respectively, whereby movement of the object through the flux pattern induces a substantially larger voltage in the first winding than in the second, the windings being connected together and arranged such that flux changes in the vicinity of the sensor due to causes other than the movement of the object tend to induce in the windings substantially equal and opposite voltages which substantially cancel each other out.

2. A sensor as claimed in claim 1, wherein the magnet is a permanent magnet.

3. A sensor as claimed in claim 1, wherein the first and second windings are substantially identical.

4. A sensor as claimed in claim 1, wherein the first and second pole pieces are substantially identical.

5. A sensor as claimed in claim 1, wherein the second pole piece has an axially movable core.

6. A sensor as claimed in claim 1, wherein the second pole piece is adjustably inclinable with respect to the axis of the first pole piece.

7. A sensor as claimed in claim 1, further comprising a second magnet, substantially identical to the first magnet, projecting from the same end of the support member as, but generally in the opposite direction to, the first magnet.

* * * * *